(12) United States Patent  (10) Patent No.: US 7,742,126 B2
Kim et al.  (45) Date of Patent: Jun. 22, 2010

(54) METHOD OF FABRICATING AN LCD, INCLUDING STEPS OF FORMING A COLOR FILTER BY PRESSING WITH A SOFT MOLD

(75) Inventors: Yong Bum Kim, Seoul (KR); Jin Wuk Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 1060 days.

(21) Appl. No.: 11/102,872

(22) Filed: Apr. 11, 2005

(65) Prior Publication Data

US 2006/0066777 A1    Mar. 30, 2006

(30) Foreign Application Priority Data

Apr. 13, 2004 (KR) ............. 10-2004-0025412

(51) Int. Cl.
G02F 1/1335 (2006.01)
G02F 1/13 (2006.01)
(52) U.S. Cl. .................. 349/106; 349/187
(58) Field of Classification Search .......... 349/106, 349/187
See application file for complete search history.

(56) References Cited

U.S. PATENT DOCUMENTS 5,425,848 A 6/1995 Haisma et al.
6,989,177 B2 * 1/2006 Lin ........................ 427/510
7,001,541 B2 * 2/2006 Dhar ........................ 264/1.27
2002/0192567 A1 * 12/2002 Kim ........................ 430/1
2004/0197682 A1 * 10/2004 Sonehara et al. ............ 430/7

FOREIGN PATENT DOCUMENTS

| JP | 4-62503 | 2/1992 |
|---|---|---|
| JP | 06-281926 | 10/1994 |
| JP | 7-5963 | 1/1995 |
| JP | 7-281168 | 10/1995 |
| JP | 11-271775 | 10/1999 |
| JP | 2002-229046 | 8/2002 |

* cited by examiner

*Primary Examiner*—Andrew Schechter
*Assistant Examiner*—Nathanael R Briggs
(74) *Attorney, Agent, or Firm*—McKenna Long & Aldridge LLP

(57) ABSTRACT

There is disclosed a liquid crystal display panel that is adaptive for simplifying its process and reducing its cost by performing a patterning process without using a photolithography process, and a fabricating method thereof.

A liquid crystal display panel according to an embodiment of the present invention includes a color filter which is formed by a press forming by a soft mold; and a black matrix to divide the color filter by the cell.

5 Claims, 17 Drawing Sheets

SPREADING COLOR FILTER MATERIAL

ALIGING SOFT MOLD

SPREADING COLOR FILTER MATERIAL

METHOD OF FABRICATING AN LCD, INCLUDING STEPS OF FORMING A COLOR FILTER BY PRESSING WITH A SOFT MOLD

This application claims the benefit of Korean Patent Application No. P2004-25412 filed in Korea on Apr. 13, 2004, which is hereby incorporated by reference for all purposes as if fully set forth herein.

BACKGROUND OF THE INVENTION

1. Field of the Invention

The present invention relates to a liquid crystal display panel and more particularly to a liquid crystal display panel that is adaptive for patterning a color filter of the liquid crystal display panel without using a photolithography process, and a fabricating method thereof.

2. Description of the Related Art

FIG. 1 is a sectional diagram representing a liquid crystal display panel of the prior art.

The liquid crystal display panel shown in FIG. 1 includes an upper array substrate having a black matrix 54, a color filter 56, an over coat layer 57, a common electrode 68, a column spacer 63 and an upper alignment film 58 which are sequentially formed on an upper substrate 52; a lower array substrate having a TFT, a pixel electrode 66 and a lower alignment film 88 which are formed on a lower substrate 82; and a liquid crystal (not shown) injected into an inner space between the upper array substrate and the lower array substrate.

In the upper array substrate, the black matrix 54 is formed on the upper substrate 52 corresponding to a TFT area of a lower plate and an area of gate lines and data lines (not shown), and there is provided a cell area where a color filter 56 is formed. The black matrix 54 prevents light leakage and absorbs an external light, thereby acting to increase contrast. The color filter 56 is formed at the cell area divided by the black matrix 54. The color filter 56 is formed by R, G and B to realize R, G and B colors. The over coat layer 57 is formed to cover the color filter to flatten the upper substrate 52. A common voltage is supplied to the common electrode 68 to control the movement of liquid crystal. The column spacer 63 acts to keep a cell gap between the upper substrate 52 and the lower substrate 82. On the other hand, it is possible that there is no over coat layer 57 in a twisted nematic TN mode where a vertical direction electric field is used, and the common electrode 68 might be formed in the lower array substrate in case of an In-Plane Switch IPS mode where a horizontal direction electric field is used.

In the lower array substrate, the TFT includes a gate electrode 59 formed on the lower substrate 82 along with a gate line (not shown); semiconductor layers 97, 64 overlapping the gate electrode 59 with a gate insulating film therebetween; and source/drain electrodes 90, 92 formed together with a data line (not shown) with the semiconductor layers 97, 64 therebetween. The TFT 37 supplies a pixel signal from the data line to the pixel electrode 66 in response to a scan signal from the gate line.

The pixel electrode 66 is in contact with a drain electrode 92 of the TFT with a protective film 100 therebetween, wherein the protective film is of a transparent conductive material with high light transmissivity. Upper/lower alignment films 58, 88 for liquid crystal alignment are formed by performing a rubbing process after spreading an alignment material such as polyimide.

FIGS. 2A to 2F are sectional diagrams representing a fabricating method of an upper array substrate of the prior art step by step.

Firstly, after an opaque metal, e.g., Chrome Cr, is deposited on the upper substrate 52, the opaque material is patterned by a photolithography using a first mask and an etching process, thereby forming the black matrix 54 as shown in FIG. 2A. Herein, the opaque resin can be used as a black matrix material.

After a red resin is deposited on the upper substrate where the black matrix 54 is formed, the red resin is patterned by photolithography using a second mask and the etching process, thereby forming a red color filter R as shown in FIG. 2B.

After a green resin is deposited on the upper substrate where the red color filter R is formed, the green resin G is patterned by photolithography using a third mask and the etching process, thereby forming a green color filter G as shown in FIG. 2C. After a blue resin is deposited on the upper substrate 52 where the green color filter G is formed, the blue resin is patterned by photolithography using a fourth mask and the etching process, thereby forming a blue color filter B as shown in FIG. 2D. Hereby, the red, green, blue color filters 56 are formed.

After a transparent conductive material is deposited on the upper substrate 52 where the color filter 56 is formed, by a deposition method such as sputtering, and then it is patterned, thereby forming the common electrode 68 as shown in FIG. 2E. On the other hand, the over coat layer 57 is located between the common electrode 68 and the color filter 57 in case of the IPS mode.

A spacer material is patterned on the upper substrate 52 where the common electrode 68 is formed, by the photolithography using a fifth mask and an etching process, thereby forming a column spacer 63 as shown in FIG. 2F.

Thus, in order to form the upper array substrate of the liquid crystal display panel of the prior art, at least 5 mask processes are required. Each of the mask processes includes the photolithography which is a series of photography processes having a spread of photo-resist, a mask alignment, an exposure and a development. In such a photolithography process, its required time for process is long, the waste of the photo-resist and a developing solution that develops the photo-resist pattern is big, and expensive equipments such as exposure equipment are required. As a result, there is a problem that the fabricating process is complicated and a fabricating cost of the liquid crystal display panel is increased.

SUMMARY OF THE INVENTION

Accordingly, it is an object of the present invention to provide a liquid crystal display panel that is adaptive for simplifying its process and reducing its cost by performing a patterning process without using a photolithography process, and a fabricating method thereof.

In order to achieve these and other objects of the invention, a liquid crystal display panel according to an aspect of the present invention includes a color filter which is formed by a press forming by a soft mold; and a black matrix to divide the color filter by the cell.

In the liquid crystal display panel, the color filter includes: a first color filter shared by adjacent two pixels; a second color filter located at both sides of the first color filter; and a third color filter located between the first color filter and the second color filter.

A fabricating method of a liquid crystal display panel according to another aspect of the present invention includes forming a black matrix on a substrate; and forming a color filter by forming a color resin with a soft mold after the color resin on the substrate where the black matrix is formed.

In the fabricating method, the color resin is a liquefied material where a resist material is mixed with at least any one resin among resins which realize first to third colors.

In the fabricating method, forming the color filter includes: forming a first color layer corresponding to a first groove by pressing a first color resin with a first soft mold having the first groove after forming the first color resin on the substrate where the black matrix is formed; forming a second color layer corresponding to a second groove by pressing a second color resin with a second soft mold having the second groove, which has wider width than the first groove, after forming the second color resin on the substrate where the first color layer is formed; and forming a third color layer corresponding to a third groove by pressing a third color resin with a third soft mold having the third groove, which has wider width than the second groove, after forming the third color resin on the substrate where the second color layer is formed.

In the fabricating method, the first color layer is formed to be located so that two color layers realizing the same color is close to each other, the second color layer is formed to cover the first color layer, and the third color layer is formed to cover the first color layer and the second color layer.

The fabricating method further includes: removing a part of the first to third color layers by at least any one process of ashing and polishing processes.

In the fabricating method, forming the color filter includes: forming a first color filter which is shared by adjacent two pixels; forming a second color filter which is located at both sides of the first color filter; and forming a third color filter which is located between the first color filter and the second color filter.

The fabricating method further includes: forming a common electrode on a substrate where the color filter is formed; and forming a spacer on the substrate where the common electrode is formed.

The liquid crystal display panel includes the color filter and the black matrix formed by the fabricating method.

In the liquid crystal display panel, the color filter includes: a first color filter shared by adjacent two pixels; a second color filter located at both sides of the first color filter; and a third color filter located between the first color filter and the second color filter.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE ILLUSTRATED EMBODIMENTS

Reference will now be made in detail to embodiments of the present invention, examples of which are illustrated in the accompanying drawings.

Hereinafter, some exemplary embodiments of the present invention will be described in detail with reference to FIGS. 3 to 5C.

Figure 1:
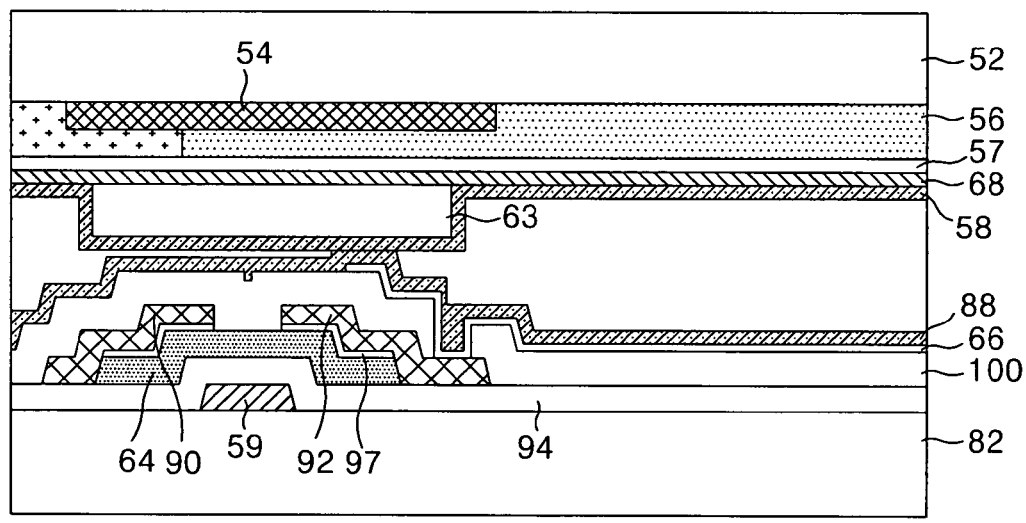
FIG. 1 is a sectional diagram representing a liquid crystal display panel of the prior art.
Figure 2A:
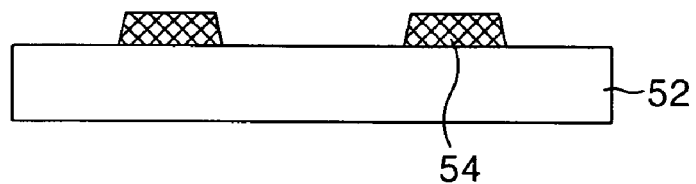
FIGS. 2A to 2F are sectional diagrams representing a fabricating method of an upper array substrate of the liquid crystal display panel of the prior art step by step.
Figure 2B:
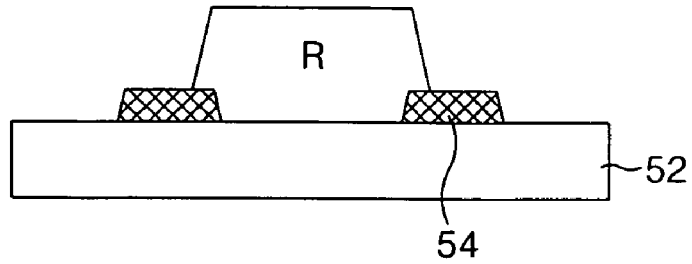
Figure 2C:
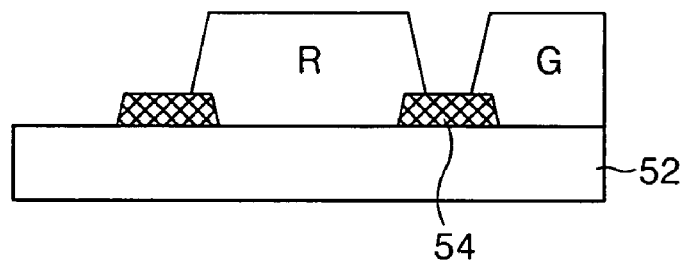
Figure 2D:
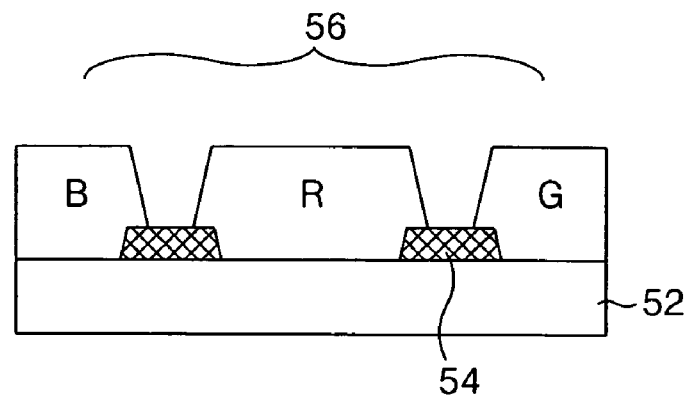
Figure 2E:
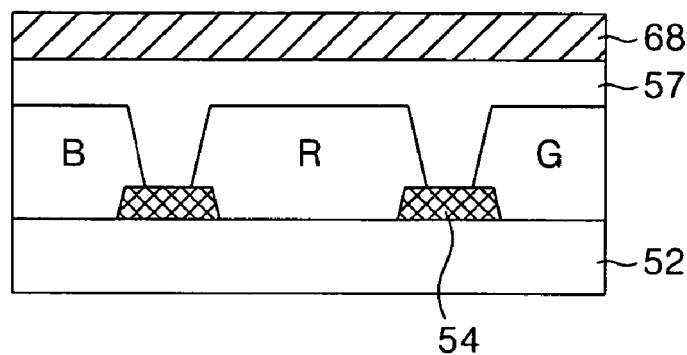
Figure 2F:
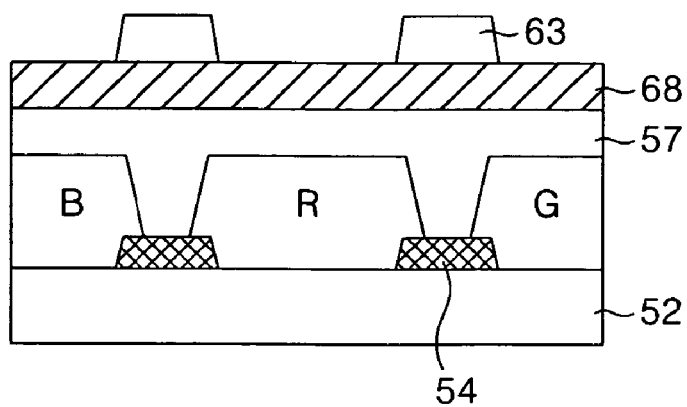
Figure 3:
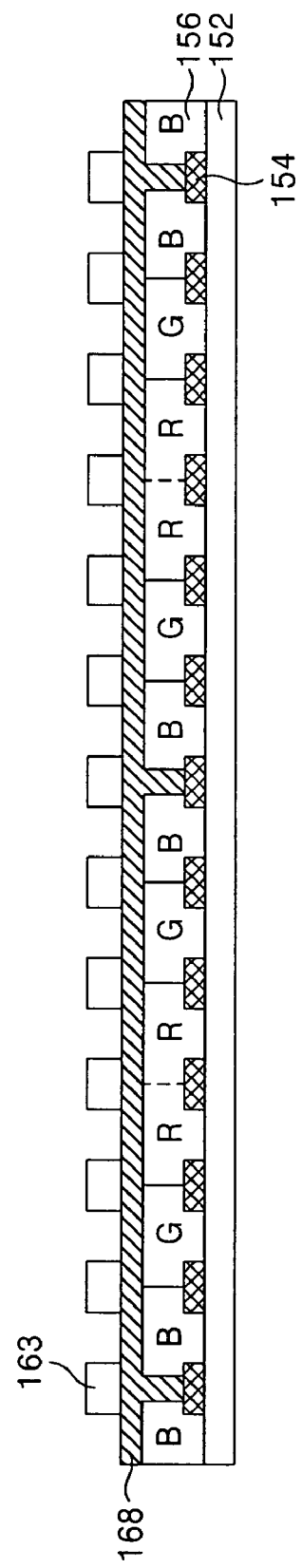
FIG. 3 is a diagram representing an upper array substrate of a liquid crystal display panel according to an embodiment of the present invention.

FIG. 3 is a sectional diagram representing an upper array substrate of a liquid crystal display panel according to an embodiment of the present invention.

Referring to FIG. 3, the liquid crystal display panel includes a black matrix 154, a color filter 156, a common electrode 168, a column spacer 163 and an upper alignment film 158 which are sequentially formed on the upper substrate 152.

The black matrix 154 is formed on the upper substrate 152 corresponding to areas of gate lines and data lines (not shown) and TFT areas of a lower plate, and provides a cell area where a color filter 156 is to be formed. The black matrix 154 prevents light leakage and absorbs external light, thereby acting to increase contrast.

The color filter 156 is formed at the cell area which is divided by the black matrix 154. The color filter 156 is formed to be arranged in order of R(red), G(green), B(blue), B(blue), G(green), R(red) to realize various colors when driving the liquid crystal display panel. Herein, the material of the color filter 156 is a liquefied material having a resin that can realize color in a resist material of heat-resistance and chemical resistance including poly ethylene glycol PEG, acrylate and photoinitiator, e.g., a resin of any one of red R, green G and blue B.

A composition of such a resist material and resin is represented in Table 1.

TABLE 1

| Composition | Poly ethylene glycol (PEG) | Acrylate | Resin of any one of red R, green G and red R | Photo-initiator |
| --- | --- | --- | --- | --- |
| Composition ratio | 20~40% | 20~40% | 20~40% | 5~15% |

An over coat layer (not shown) might be formed on the color filter 156 to flatten the upper substrate 152.

A common voltage is supplied to the common electrode 168 for controlling the movement of liquid crystal. The common electrode 168 may be formed in the lower array substrate where the thin film transistor is formed in case of in-plane switch IPS using a horizontal direction electric field. The column spacer 163 acts to maintain a cell gap between the upper substrate 152 and the lower substrate 182.

The upper array substrate is bonded to a lower array substrate (not shown) that includes a thin film transistor TFT, a plurality of signal lines (gate line and data line), a pixel electrode and a lower alignment film.

Figure 4A:
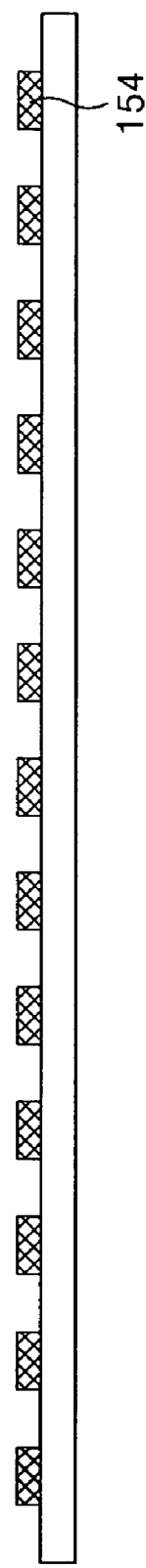
FIGS. 4A to 4I are diagrams representing a fabricating method of the upper array substrate shown in FIG. 3.

FIGS. 4A to FI is a sectional diagram representing steps of the fabricating method of an upper array substrate according to the present invention.

Firstly, after an opaque metal, e.g., Chrome Cr, is deposited in the supper substrate 152, the opaque material is patterned by a photolithography using a first mask and an etching process, thereby forming the black matrix 154 as shown in FIG. 4A. Herein, an opaque resin might be used as a black matrix material.

Figure 4B:
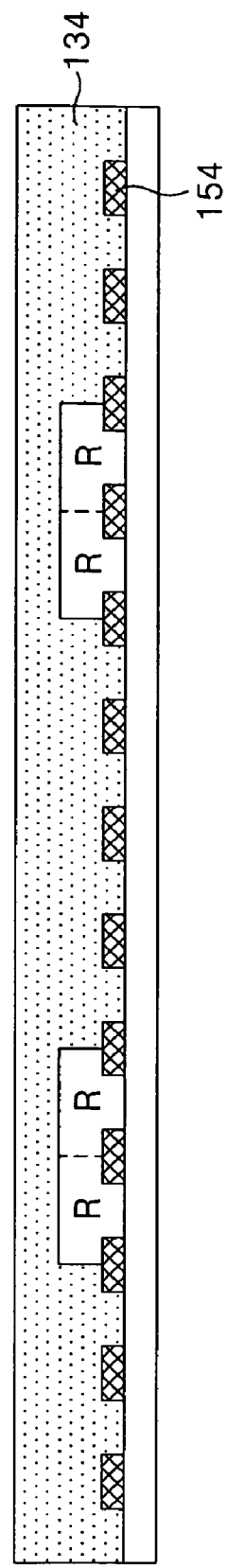

After a liquefied material where a red resin is mixed with a resist material is spread on the upper substrate 152 where the black matrix 154 is formed, two red color layers R are formed to be located close to each other by use of a first soft mold as shown in FIG. 4B.

These are explained specifically referring to FIGS. 5A to 5C as follows.

Figure 5A:
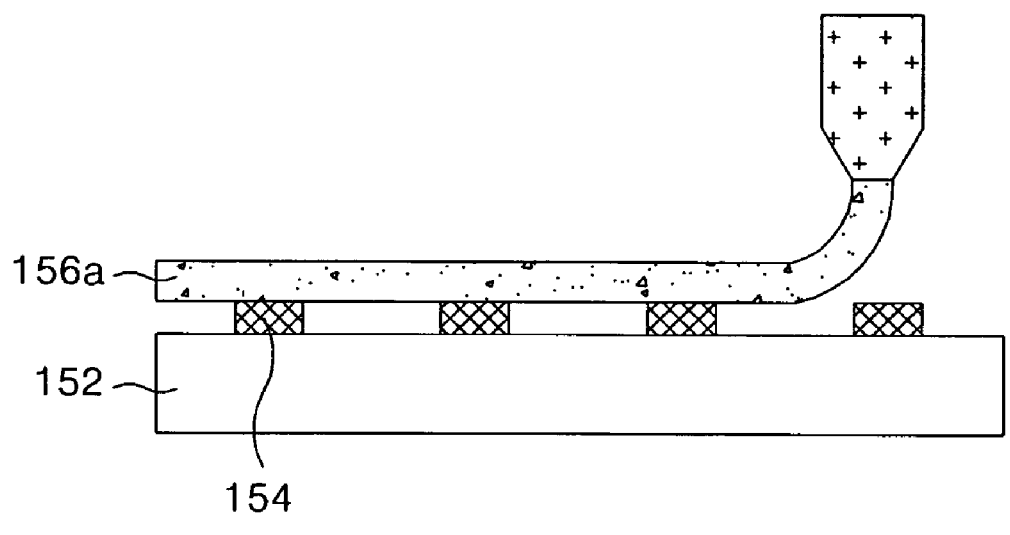
FIGS. 5A to 5C are diagrams illustrating the formation of a color layer using a soft mold.

A liquefied material 156 of red R color is spread over the upper substrate, where the black matrix 154 is formed, by a spreading method of nozzle or spin coating as shown in FIG. 5A. Herein, the red R color material 156A is a liquefied material where a red R resin is mixed with a resist material of heat-resistance and chemical resistance including poly ethylene glycol PEG, acrylate and photoinitiator. The composition of such a red R color material is represented specifically in Table 2.

TABLE 1

| Composition | Poly ethylene glycol (PEG) | Acrylate | Red R resin | Photo-initiator |
|---|---|---|---|---|
| Composition ratio | 20~40% | 20~40% | 20~40% | 5~15% |

Figure 5B:
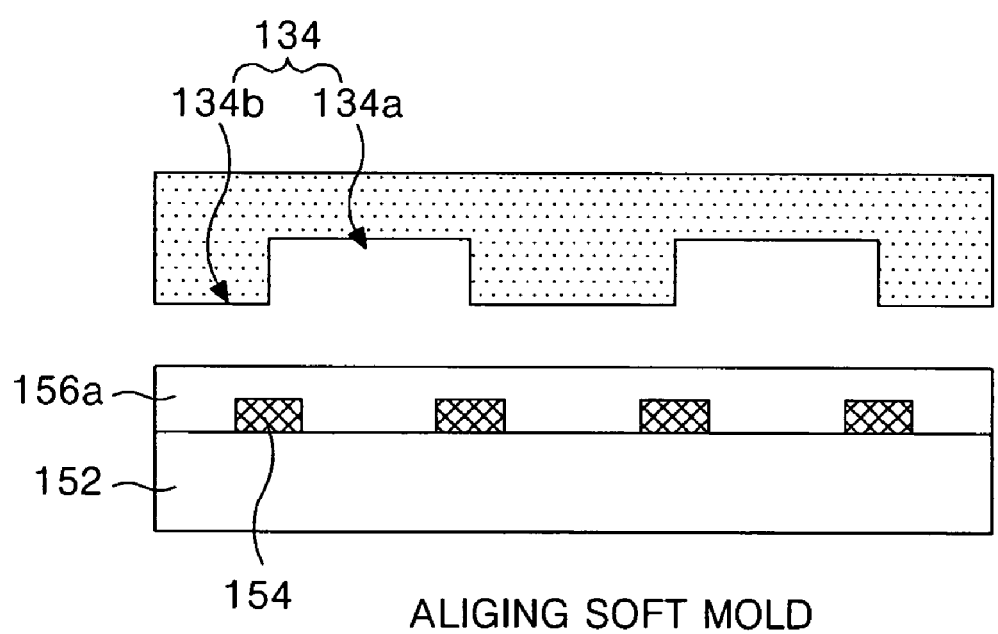
Figure 5C:
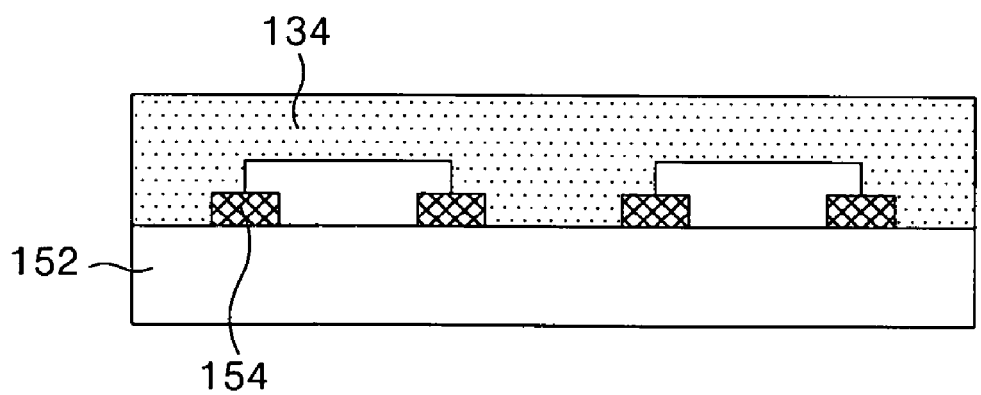

Subsequently, a first soft mold 134 having a groove 134A and a projected part 134B is aligned to the color material as shown in FIG. 5B. The groove 134A of the first soft mold 134 corresponds to an area where the red R color filter is to be formed. The first soft mold 134 is made of a rubber material, of which the elasticity is big, e.g., poly dimethyl siloxane PDMS, poly urethane, cross-linked novolac resin and so on.

The first soft mold 134 is pressed to the color material under its own weight for a designated time, for example, from anywhere between 10 minutes to 2 hours, to ensure contact between the surface of the first soft mold and the substrate 152 and the black matrix 154. At this moment, the substrate 152 is baked at a temperature of about 130° C. or below. Then, the color filter material is moved into the groove 134A of the soft mold 134 by a capillary force, which is generated by the pressure between the soft mold 134 and the substrate 152, and a repulsive force between the soft mold 134 and the color material. Accordingly, there is formed the red color layer R of the pattern shape that the groove 134A of the soft mold 134 is transferred reversely as shown in FIG. 5C.

Figure 4C:
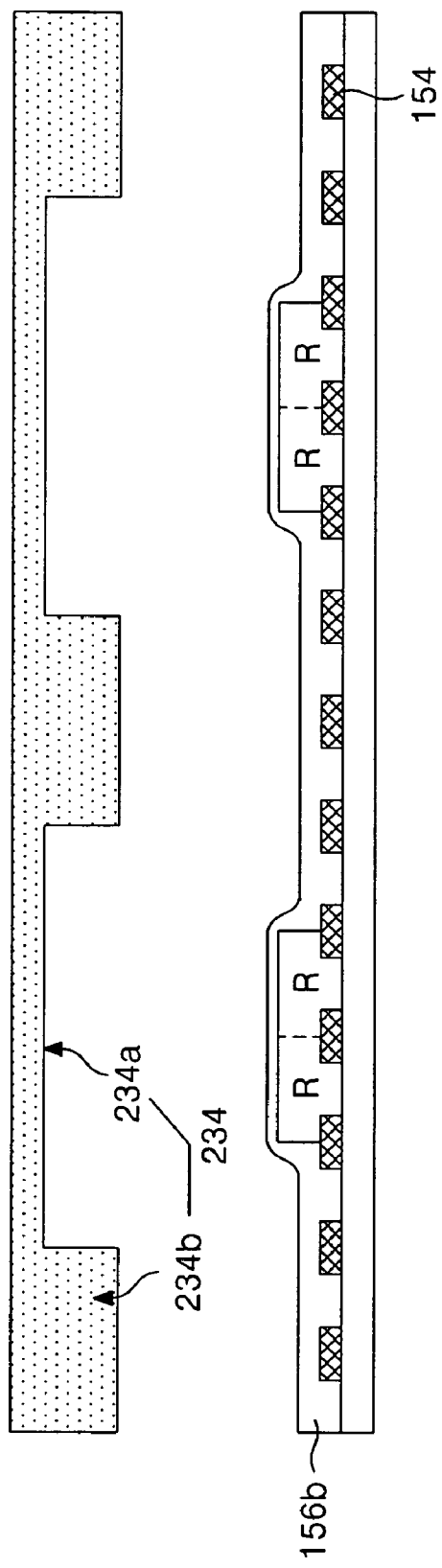

After a liquefied material 156B where a green G resin is mixed with a resist material is spread on the upper substrate 152 where two red color layers R adjacent to each other are formed by the above-mentioned method, a second soft mold 234 is aligned wherein the second soft mold 234 has a groove 234A which is as big as four color filters can be located, as shown in FIG. 4C. Herein, the second soft mold 234 is aligned so that two adjacent red color layers R are located in the center of the groove 234A of the second soft mold 234.

Figure 4D:
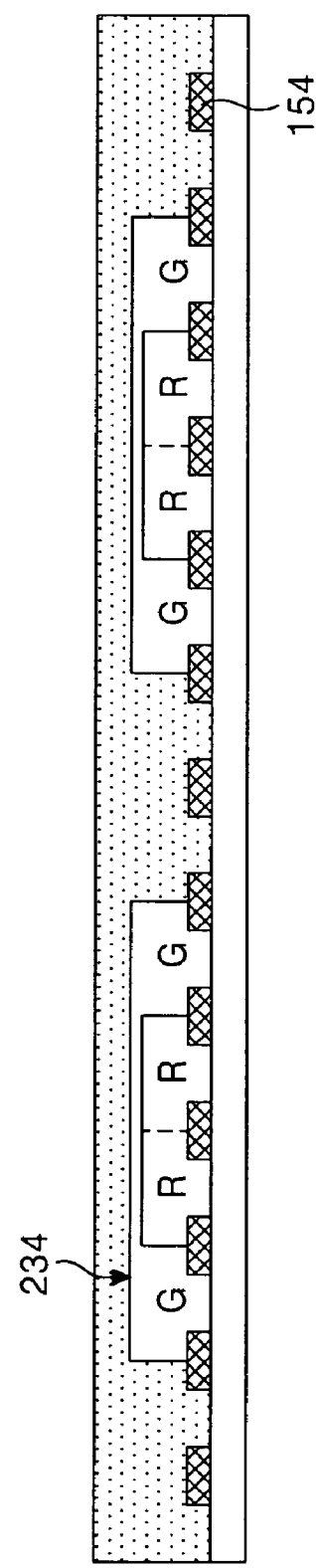

A green color layer G is formed to locate at both sides of the two red color layers R which are formed to close to each other as shown in FIG. 4D and to cover the red color layer R, by use of the second soft mold 234. Herein, the green color layer G using the second soft mold 234 is formed by the same method as the method shown in FIGS. 5A to 5C.

Figure 4E:
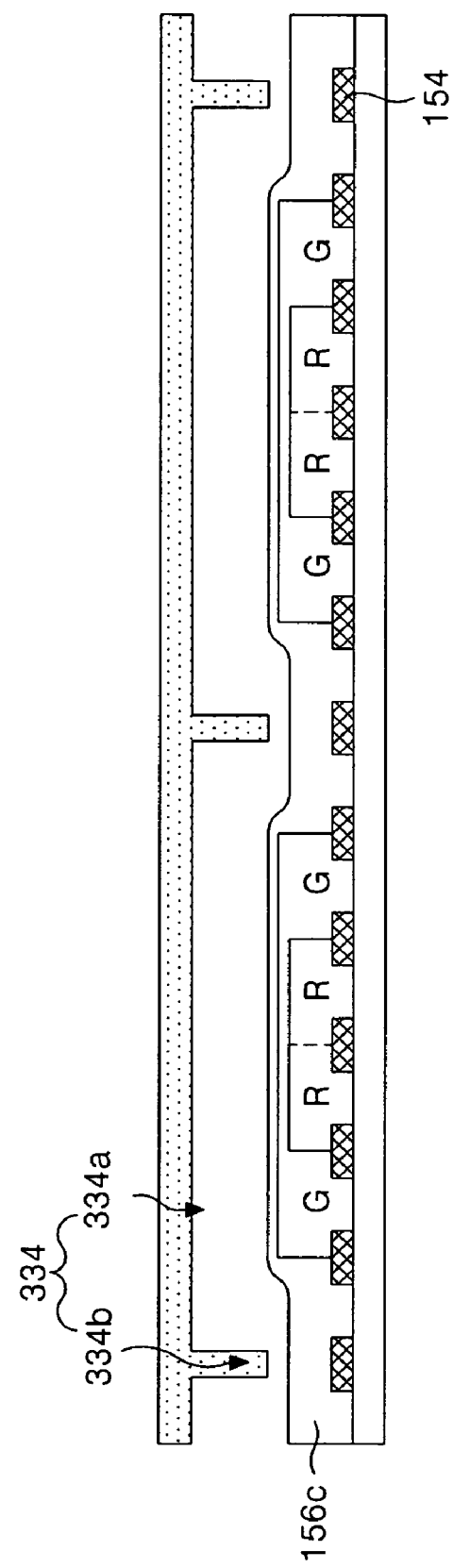

After a liquefied material 156C where a blue B resin is mixed with a resist material is spread on the substrate 152 where the green color layer G is formed, a third soft mold 334 is aligned wherein the third soft mold 334 has a groove 334A which is as big as six color filters can be located, as shown in FIG. 4E. Herein, the third soft mold 334 is aligned so that the red and green color layers R, G are located in the center of the groove 334A of the third soft mold 334.

Figure 4F:
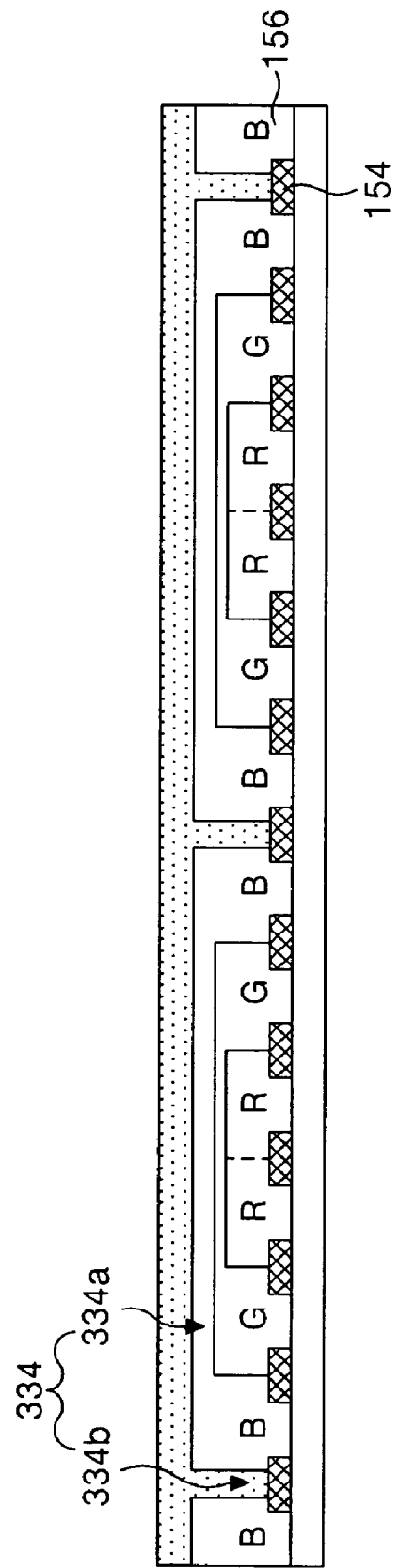

A blue color layer B is formed to locate between the green and red color layers C, R as shown in FIG. 4F and to cover the red and green color layers R, G, by use of the third soft mold 334.

Herein, the blue color layer B using the third soft mold 334 is also formed by the method shown in FIGS. 5A to 5D.

Figure 4G:
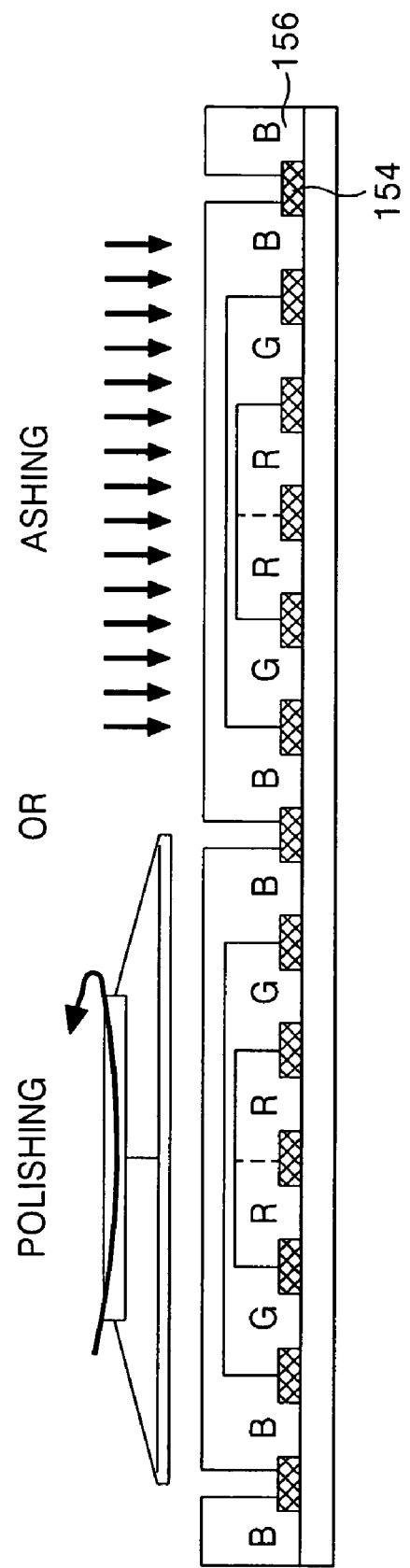
Figure 4H:
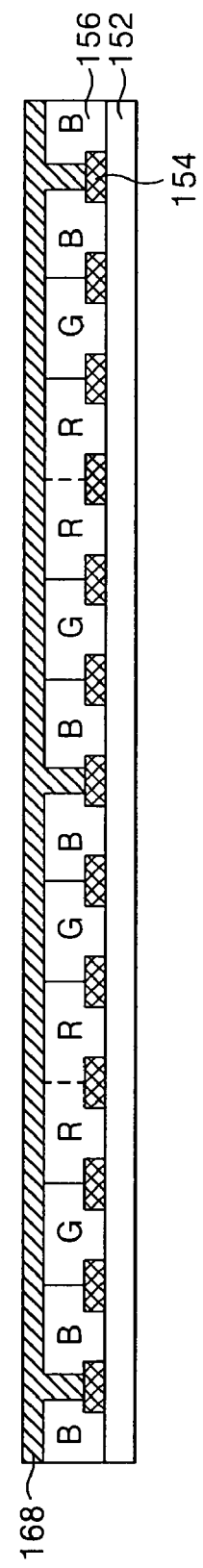

In this way, after the R, G, B color layers are formed, R, G, B color layers are partially removed by a polishing process and an ashing process, thereby forming the red, green and blue color filters 156 as shown in FIG. 4G After a transparent conductive material is deposited on the upper substrate 152, where the red, green, blue color filters 156 are formed, by a deposition method such as sputtering, it is patterned to form a common electrode 168 as shown in FIG. 4H.

Figure 4I:
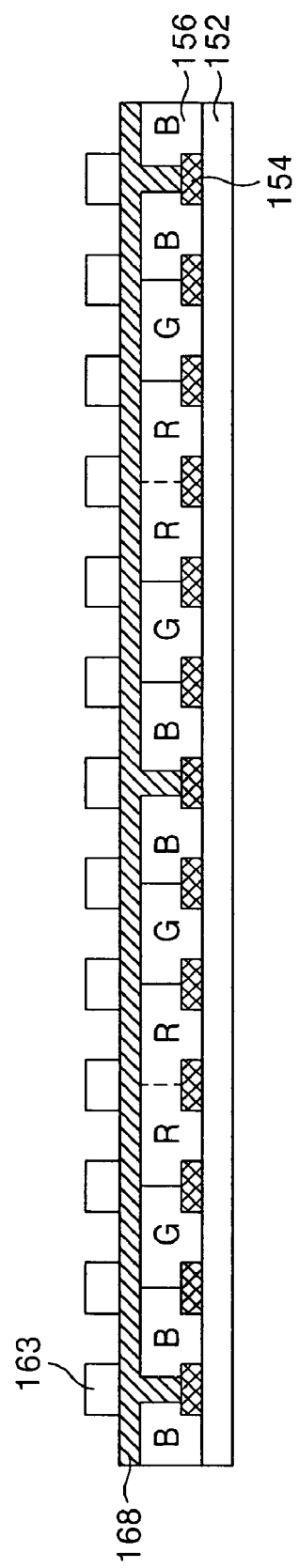

A spacer material is patterned by a photolithography using a mask and an etching process to form a column spacer 163 on the upper substrate 152 where the common electrode 168 is formed as shown in FIG. 4I.

In this way, the liquid crystal display panel and the fabricating method thereof according to the present invention forms a color filter using the soft mold and a material that a resist is mixed with a color resin, without using a photo process. Accordingly, the exposure and development processes are omitted, thus the waste of a developing solution can be reduced and the expensive equipment such as exposure equipment is not required. Further, a baking process and a patterning process (mold process) are simultaneously in progress, thus its process becomes simplified. As a result, its fabricating process is simplified and its cost is reduced, thereby improving its manufacturing yield.

The method of forming the color filter using the soft mold and the material with which the resist is mixed in with the color resin without using the photo process can be easily applied to the liquid crystal display panel of electrical controlled birefringence ECB, further vertical alignment VA mode as well as the liquid crystal display panel of IPS mode and the liquid crystal display panel of TN mode.

As described above, the liquid crystal display panel and the fabricating method thereof according to the present invention forms the color filter using the soft mold and the material that the resist is mixed with the color resin without using the photo process. Accordingly, the exposure and development process is omitted and the baking process and the patterning process (mold process) are simultaneously in progress, thus the progress is simplified and the cost is reduced.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A fabricating method of a liquid crystal display panel, comprising:
   forming a black matrix on a substrate; and
   forming a color filter by pressing a color resin with a soft mold after the color resin is applied to the substrate having the black matrix, wherein forming the color filter includes:

forming a first color layer corresponding to a first groove by pressing a first color resin with a first soft mold having the first groove after forming the first color resin on the substrate where the black matrix is formed;

forming a second color layer corresponding to a second groove by pressing a second color resin with a second soft mold having the second groove, which has wider width than the first groove, after forming the second color resin on the substrate where the first color layer is formed; and forming a third color layer corresponding to a third groove by pressing a third color resin with a third soft mold having the third groove, which is wider than the second groove, after forming the third color resin on the substrate where the second color layer is formed.

2. The fabricating method according to claim 1, wherein the color resin is a liquefied material where a resist material is mixed with at least any one resin among resins which realize first to third colors.

3. The fabricating method according to claim 1, wherein the first color layer is located so that two color layers realizing the same color are close to each other, the second color layer covers the first color layer, and the third color layer covers the first color layer and the second color layer.

4. The fabricating method according to claim 1, further comprising:

removing a part of the first to third color layers by at least any one process of ashing And polishing.

5. The fabricating method according to claim 1, further comprising:

forming a common electrode on a substrate where the color filter is formed; and forming a spacer on the substrate where the common electrode is formed.

* * * * *